United States Patent

[11] 3,607,928

[72] Inventors Albert William Lutz;
 Richard Joseph Magee, both of Princeton, N.J.
[21] Appl. No. 672,446
[22] Filed Oct. 3, 1967
[45] Patented Sept. 21, 1971
[73] Assignee American Cyanamid Company
 Stamford, Conn.

[54] PROCESS FOR THE PREPARATION OF METHIONINE SULFOXIMINE
 6 Claims, No Drawings
[52] U.S. Cl. .................................................... 260/534 S, 71/103
[51] Int. Cl. ...................................................... C07c 101/00
[50] Field of Search ......................................... 260/534 S

[56] References Cited
UNITED STATES PATENTS
2,648,705 8/1953 Reiner et al. .................. 260/534

OTHER REFERENCES
Bentley et al., Proc. Royal Soc., 138B, 265, 1951.
Wagner et al., Synthetic Org. Chem., 1953, p. 574.
Kohlbrenner et al., J. Am. Chem. Soc., 77, 6066, 1955.
Marsile et al., Chim. 52, 112, (1962).

Primary Examiner—Lewis Gotts
Assistant Examiner—Robert Gerstl
Attorney—Charles J. Fickey ABSTRACT: An improved process for the preparation of methionine sulfoximine which comprises reacting methionine sulfoxide with an alkali metal azide at temperatures of 25° to 50° C., in the presence of sulfuric acid containing essentially no free water in the absence of immiscible organic solvents.

PROCESS FOR THE PREPARATION OF METHIONINE SULFOXIMINE

This invention relates to an improved process for the preparation of acyclic amino carboxylic acids and salts thereof and, in particular, to an improved process for preparing methionine sulfoximine.

It is known in the art, from H. R. Bentley et al., "Proc. Royal Soc. (London) 138B," pg. 265 (1951) that methionine sulfoximine has been prepared in 27% yield by reacting methionine sulfoxide and sodium azide in the presence of concentrated sulfuric acid and chloroform at 45 –50° C. The product was purified using a Zeo Carb ion exchange resin.

In addition, U.S. Pat. No. 2,648,705 (1953) describes a process for preparing methionine sulfoximine similar in most respects to the Bentley technique except that a chloroform solution of hydrazoic acid is first prepared which is then added to a chloroform-concentrated sulfuric acid solution of methionine sulfoxide. Reaction temperature is 40° C. The patent cites no product yield.

Although the prior art methods obtained a methionine sulfoximine product, the processes had certain disadvantages. The main difficulties of prior art processes for preparing methionine sulfoximine are the low yield and the difficulties of isolating the solid product.

It is therefore an object of our invention to present an improved process for preparing methionine sulfoximine wherein product yields of 90–95% of a product of 95–97% purity may be consistently obtained.

It is also an object of our invention to present techniques whereby methionine sulfoximine may be readily and inexpensively obtained in highly purified form in high yield. A further objective is to offer a process for preparing methionine sulfoximine more amenable to large scale processing than prior art processes. These and other objects of our invention will become apparent as the description thereof proceeds.

The above objects may be achieved and the disadvantages of the invention may be overcome by the use of the present invention. In the invention, the improved process for preparing methionine sulfoximine comprises reacting a solution of methionine sulfoxide in a mixture of concentrated sulfuric acid, and fuming sulfuric acid (oleum), with a solid alkali metal azide, e.g. sodium azide, at temperatures of 25–50° C. whereby the reaction takes place under substantially anhydrous conditions.

Methionine sulfoxide may be prepared in essentially quantitative yield by reacting methionine with hydrogen peroxide in the presence of either acetic acid or water. The purified methionine sulfoxide so obtained is dissolved in a concentrated (98%) sulfuric acid-oleum mixture. Oleum should be present in sufficient quantity to assure the reaction of the free water introduced with the concentrated sulfuric acid with sulfur trioxide to produce sulfuric acid, the principal function of the oleum being to eliminate as much of the reaction inhibiting free water from the reaction medium as possible. Oleum in any conveniently available concentration may be utilized. When using 20% oleum, sulfuric acid/oleum weight ratios of 1/0.5 and 1/1 are satisfactory.

Similar reaction media may be prepared by adding the appropriate amount of anhydrous sulfur trioxide to sulfuric acid containing various amounts of water.

A solid alkali metal azide, such as, sodium or potassium azide added to the sulfuric acid-oleum solution of methionine sulfoxide while maintaining reaction temperature at 25°–50° C. The completeness of the reaction is evidence by the cessation of nitrogen evolution. The product is initially formed as methionine sulfoximine hydrogen sulfate.

The reaction mixture is then cooled and diluted with water whereupon the solution is passed over a strongly acidic cationic ion exchange resin. The methionine sulfoximine product is retained by the resin and may be conveniently eluted by an aqueous ammonium hydroxide solution. The efficiency of the elution of the product is a function of the flow rate of the ammonium hydroxide solution. The product may be collected in yields of 90–95% either as an aqueous solution or as a solid, following evaporation of the water. Collection of the product as an aqueous solution is particularly advantageous since methionine sulfoximine is a herbicidally active compound frequently dispensed as an aqueous solution or as an aqueous spray. Product purity is ordinarily 95% to 97%.

The absence of chloroform from the reaction, in addition to the advantages derived from the elimination of a hazardous chemical medium, and improvement of yield, creates a significant reduction in reactor volume, a feature which facilitates scale-up of the process to larger equipment.

The simplified purification procedure eliminates the time-consuming and tedious purification sequence outlined in U.S. Pat. No. 2,648,705, wherein sulfate is removed by a difficult barium sulfate filtration and wherein the product is precipitated by addition of a large quantity of costly ethyl alcohol. Although Bentley et al. employed an ion exchange resin to purify the methionine sulfoximine, an ethyl alcohol precipitation was still required to obtain a relatively pure solid product.

We have therefore found that without the presence of chloroform, in the present process, the yield of methionine sulfoximine is surprisingly increased from 27% to 75%, as obtained by Bentley, indicating the drastic adverse effect which the presence of chloroform has on the yield of methionine sulfoximine. Furthermore, when fuming sulfuric acid (oleum) is added to the concentrated sulfuric acid and the chloroform is again eliminated, the yield of methionine sulfoximine is increased further from 75% to 90–95% indicating that the free water associated with concentrated sulfuric acid (usually 1–2 %) is exercising an adverse effect on yield, an effect which is greatly minimized when the free water is converted into sulfuric acid by the gaseous sulfur trioxide present in the oleum. The surprising adverse effect of water upon product yield may be further illustrated when chloroform was totally eliminated from the reaction, but an aqueous sodium azide solution instead was added in place of the solid sodium azide to the sulfuric acid-methionine sulfoxide solution, and a yield of 44% was obtained. As indicated above, when solid sodium azide was used in the same reaction, the yield was 75%. It is thus clear that both chloroform and water have a highly adverse effect on product yield in the reaction and their elimination from the reaction by the present process has surprisingly resulted in greatly increased yield.

The dramatic effect of chloroform and water upon product yield was obviously not taught by the prior art and would not ordinarily be obvious to one skilled in the art.

While we do not wish to be bound by the following explanation, we believe that the reaction mixture of the present process may form hydrazoic acid by the reaction of the alkali metal azide with sulfuric acid, and the hydrazoic acid further reacts with methionine sulfoxide to form the desired methionine sulfoximine. It should therefore be possible to use hydrazoic acid as a starting material in the reaction.

The compounds of the inventive process exhibit both preemergence and postemergence herbicidal activity.

The successful cultivation of crops normally require the control of undesirable vegetation with a minimum expenditure of time, effort and expense. Among the methods employed to control such vegetation is the use of herbicidal compositions. While numerous such compositions have been used successfully in the past, none are available which may be applied satisfactorily under a variety of conditions and for a large variety of purposes. Thus, of the compounds useful in the control of undesirable growth, many are extremely selective, i.e., effective against a limited number of plant species. Few are sufficiently water soluble to permit the preparation of simple solutions in water, while others may be applied only preemergence or postemergence. Further, most highly effective herbicidal compositions exhibit long term residual herbicidal activity which prevents their application just prior to planting.

The compounds of this invention provide a method for the control of undesirable plant growth employing a herbicidal composition which is effective under a variety of conditions, i.e., preemergence, postemergence, application to the locus, application to foliage or leaves; and for a large variety of purposes, that is, the control of a wide variety of plant species. They provide aqueous compositions for the control of undesirable plant growth which are readily prepared by simple dilution in water of highly effective herbicidal compounds.

They also provide a herbicidal composition having a limited period of residual activity, thus enabling them to be employed shortly before planting.

The compounds prepared according to the invention are therefore highly useful herbicidal compounds which may be used as described in U.S. Pat. Nos. 3,295,949 and 3,323,895.

The following examples are provided to further illustrate but not limit the invention.

EXAMPLE I

Preparation of Methionine Sulfoxide

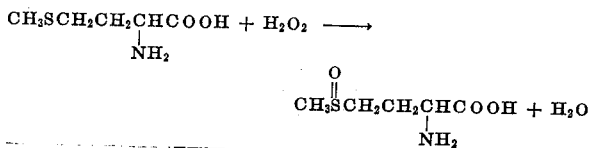

A thick paste of methionine (100 g., 0.67 mole) and water (150 ml.) was stirred while 30% hydrogen peroxide (78.0 g., 2.6% excess) was added at such a rate that the temperature was held between 60° and 65° C. Ice cooling was provided as necessary. The time of addition was approximately one-half hour. The solution was then stripped on a rotating evaporator to near dryness, and the resulting paste transferred to a dish for complete drying in a vacuum oven at 70° C. The yield of the white solid with m.p. 234–35° C. was quantitative.

EXAMPLE II

Preparation of Methionine Sulfoximine

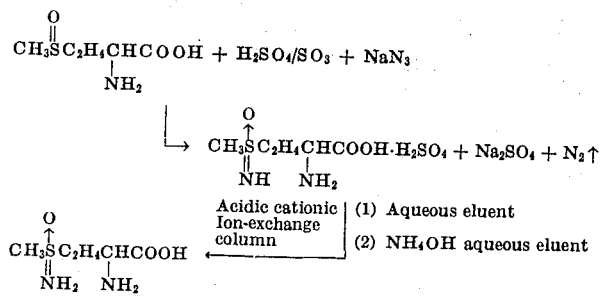

The sulfoxide prepared in Example I was dissolved in 300 ml. of 1:1 by volume concentrated $H_2SO_4$/20% oleum mixture with stirring and with sufficient cooling to maintain the temperature between 30°–45° in a 3-liter 3-neck flask.

The flask was equipped with a nitrogen inlet tube, thermometer, and hopper device for introducing a solid. The hopper was of such a design that sodium azide could be introduced without opening the system to the atmosphere. The exit gasses swept through an empty trap and then through a trap containing N NaOH.

After cooling the viscous solution to 20° C. and with a low rate of nitrogen sweeping the system, sodium azide was added in nine equal increments of approximately 5 grams each (43.5 g. total) via the hopper. After each addition foaming occurred as nitrogen was released and the temperature slowly but steadily rose. No increment of $NaN_3$ was added until the nitrogen evolution as observed in the sodium hydroxide trap was almost reduced to that supplied by the cylinder nitrogen. When the reaction temperature reached 40° C. (after two to three additions of sodium azide), an ice bath was used to bring the temperature down to about 30° C. The total addition time was an hour and the reaction was considered complete 10 minutes after the last azide addition as determined by the nitrogen evolution rate. The thick reaction mixture was stirred for an additional 20 minutes as the temperature dropped to room temperature. Similar results are obtained by substituting the appropriate amount of potassium azide for sodium azide.

The reaction mixture was poured over 2,000 g. ice and then diluted with water to a 4-liter volume (about 12% sulfuric acid). The solution was passed over a column of 800 g. (wet weight) of a polystyrene sulfonic acid-type resin in bead form at a rate of approximately 50 ml./min. The resin was in the acid form and had been preprepared by washing with 2 to 3 liters of water until the pH was 6 to 7.

The resin was then washed with 12 liters of deionized water or until the pH was raised to 6 to 7. At this point the solution in the column had a yellow-orange color. Elution of the product was effected with 2 N $NH_4OH$ at a rate of 10 to 11 ml./min. As the front moved down the column, the exhausted resin assumed a yellow color. There was a mild exotherm at the front. The point at which collection of forerun can be discontinued (600 ml.) is accurately determined by collecting three drops of the eluent in 10 ml. acetone. The formation of a haze (eventually becoming a definite precipitate as the elution continues) indicates the presence of the product in the eluent. The major portion of the product appears in the next 800 ml. at a pH of approximately 7. Concentration to dryness by stripping on a rotary evaporator and subsequent drying in a vacuum oven at 50°–60° gave 106.0 g. (87.6%). m.p. 219°–200° C. The remainder of the product appears in the next 240 ml. eluting at a pH of 8.5–11 (8.6 g., 7.1%). The total yield was therefore 114.6 g. (94.7%).

While certain specific embodiments and preferred modes of practice of the invention have been set forth, it will be understood that this is solely for illustration, and that various changes and modifications may be made without departing from the spirit of the disclosure or the scope of the appended claims.

1. A process for preparing the hydrogen sulfate of methionine sulfoximine which comprises reacting methionine sulfoxide with an alkali metal azide at temperatures of 25° to 50° C. in a reaction medium consisting of a mixture of concentrate sulfuric acid and fuming sulfuric acid.

2. The process of claim 1 further comprising removing the hydrogen sulfate by chromatographing the reaction mixture on a column of strongly acidic, cationic ion exchange resin sequentially eluting said column with water to remove the hydrogen sulfate and aqueous ammonium hydroxide to remove the purified methionine sulfoximine.

3. The process of claim 1 wherein said alkali metal azide is sodium azide.

4. The process of claim 1, wherein the mixture of concentrated sulfuric acid and fuming sulfuric acid is prepared in situ by adding anhydrous sulfur trioxide to sulfuric acid.

5. The process of claim 1 wherein said sulfuric acid is 98% concentrated and said oleum is 20% oleum.

6. The process of claim 1 wherein the ratio by weight of concentrated sulfuric acid to oleum is from about 1:0.5 to 1:1.